United States Patent
Park et al.

(10) Patent No.: US 7,804,805 B2
(45) Date of Patent: Sep. 28, 2010

(54) APPARATUS AND METHOD FOR SCHEDULING TRANSMISSION OF DATA PACKETS IN A MULTICHANNEL WIRELESS COMMUNICATION SYSTEM

(75) Inventors: Won-Hyoung Park, Seoul (KR); Sung-Hyun Cho, Suwon-si (KR); Dae-Young Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 656 days.

(21) Appl. No.: 11/475,601

(22) Filed: Jun. 27, 2006

(65) Prior Publication Data
US 2007/0019599 A1    Jan. 25, 2007

(30) Foreign Application Priority Data
Jun. 27, 2005    (KR) ............... 10-2005-0055983

(51) Int. Cl.
*H04W 4/00*    (2009.01)
(52) U.S. Cl. ............... 370/338; 370/468; 370/465; 370/395.42; 370/329; 370/395.4; 370/395.43; 370/347; 370/412; 370/415; 370/417; 370/418; 370/395.41; 455/509; 455/450; 455/452.2; 455/453; 455/512; 455/513; 380/249; 725/6; 725/27
(58) Field of Classification Search ............. 370/468, 370/465, 338, 395.4, 395.43, 347, 412, 415, 370/417, 418, 395.41, 395.42; 455/509, 455/450, 452.2, 453, 512, 513; 380/249; 726/6, 27
See application file for complete search history.

(56) References Cited

U.S. PATENT DOCUMENTS

| 6,785,252 B1 * | 8/2004 | Zimmerman et al. ......... 370/337 |
| 6,850,540 B1 * | 2/2005 | Peisa et al. ................... 370/468 |

(Continued)

FOREIGN PATENT DOCUMENTS

EP    1 257 096    11/2002

(Continued)

OTHER PUBLICATIONS

Jonathan Sau et al., Scheduling and Quality of Service in the General Packet Radio Service, 1998 International Conference on Universal Personal Communications, pp. 1067-1071.

*Primary Examiner*—Rafael Pérez-Gutiérrez
*Assistant Examiner*—Nimesh Patel
(74) *Attorney, Agent, or Firm*—The Farrell Law Firm, LLP

(57) ABSTRACT

A method and apparatus for scheduling the data packets transmitted to a plurality of mobile terminals supporting multiple quality of service (QoS) grades in a multichannel wireless communication system includes a storage device for storing queues and data packets of the mobile stations, the queue and data packets of each of the mobile stations being arranged in an order of the quality of service grades; and a scheduler for allocating resources of multiple channels to the mobile stations based on different scheduling metrics separately applied to the multiple channels according to the quality of service grades, each of the scheduling metrics applied to a particular one of channels being used to select one of the mobile stations whose data packets are transmitted through the particular channel; wherein entire data packets of the mobile stations are transmitted through the multiple channels when the allocation of the channel resources has been completed sequentially for each of the multiple channels.

2 Claims, 4 Drawing Sheets

U.S. PATENT DOCUMENTS

| | | | |
|---|---|---|---|
| 2002/0183084 A1* | 12/2002 | Wu et al. | 455/509 |
| 2004/0090916 A1 | 5/2004 | Hosein | |
| 2005/0226268 A1* | 10/2005 | Wang et al. | 370/465 |

FOREIGN PATENT DOCUMENTS

| | | |
|---|---|---|
| EP | 1 330 080 | 7/2003 |
| EP | 1 370 035 | 12/2003 |
| JP | 2005-045561 | 2/2005 |
| WO | WO 2004/070996 | 8/2004 |

\* cited by examiner

APPARATUS AND METHOD FOR SCHEDULING TRANSMISSION OF DATA PACKETS IN A MULTICHANNEL WIRELESS COMMUNICATION SYSTEM

PRIORITY

This application claims priority under 35 U.S.C. §119 to an application entitled "Apparatus For Scheduling Transmission Of Data Packets In A Multichannel Wireless Communication System And A Method Therefor" filed in the Korean Intellectual Property Office on Jun. 27, 2005 and assigned Serial No. 2005-55983, the contents of which are incorporated herein by reference.

BACKGROUND OF THE INVENTION

1. Field of the Invention

The present invention relates to an apparatus for scheduling transmission of data packets, and more particularly to an apparatus and method for allocating the resources of multiple channels to a plurality of mobile stations in a multichannel wireless communication system.

2. Description of the Related Art

Radio resources management is implemented to effectively manage and use the radio resources in a mobile communication system for providing multimedia services together with high-speed data transmission. The scheduling of the transmission of data packets is essential for radio resources management, for which has been typically used the PF (Proportional Fair) scheduler. This scheduler considers both system yield rate and fair distribution of the resources among the users in an environment of radio channels varying with time and users. However, the PF scheduler does not consider quality of service (QoS). In order to consider QoS, the M-LWDF (Modified Largest Weighted Delay First) scheduler has been proposed. However, this scheduler cannot satisfy the system throughput versus QoS trade-off. Furthermore, both the PF scheduler and M-LWDF scheduler operate for a single channel.

Alternatively, there have been proposed the sub-channel allocation algorithms of the orthogonal frequency division multiple access (OFDMA) system, for managing the radio resources in considering multiple channels. This is to deduce the data rate allocated to each mobile station for each frame by using a separate algorithm. However, problems in combining with the packet scheduler arise in this method, which adversely affects both system throughput and QoS since the QoS must be considered frame by frame.

SUMMARY OF THE INVENTION

It is an object of the present invention to provide a method and apparatus for scheduling transmission of data packets considering multiple QoS grades in a multichannel wireless communication system.

It is another object of the present invention to provide a method and apparatus for scheduling transmission of data packets considering multiple QoS grades by using a scheduler for a single channel in a multichannel wireless communication system.

According to the present invention, a method and apparatus for scheduling the data packets transmitted to a plurality of mobile terminals supporting multiple QoS grades in a multichannel wireless communication system includes a storage device for storing queues and data packets of the mobile stations, the queue and data packets of each of the mobile stations being arranged in an order of the quality of service grades; and a scheduler for allocating resources of multiple channels to the mobile stations based on different scheduling metrics separately applied to the multiple channels according to the quality of service grades, each of the scheduling metrics applied to a particular one of channels being used to select one of the mobile stations whose data packets are transmitted through the particular channel; wherein entire data packets of the mobile stations are transmitted through the multiple channels when the allocation of the channel resources has been completed sequentially for each of the multiple channels.

According to the present invention, a method and apparatus for scheduling the data packets transmitted to a plurality of mobile terminals supporting multiple QoS grades in a multichannel wireless communication system includes a storage device for storing queues and data packets of the mobile stations, the queue and data packets of each of the mobile stations being arranged in an order of the quality of service grades; and a scheduler for selecting a channel having the highest channel rate for each of the mobile stations among corresponding channels in sequence for each of the multiple channels, selecting a mobile station using a scheduling metric in the selected channel, allocating resources of a corresponding channel for a data packet of the selected mobile station, and if resource allocation for the multiple channels is fully completed in sequence, simultaneously transmitting data packets of the plurality of mobile stations using the resources allocated for each individual channel.

According to the present invention, a method and apparatus for scheduling the data packets transmitted to a plurality of mobile terminals supporting multiple QoS grades in a multichannel wireless communication system includes selecting, sequentially, different scheduling metrics separately applied to multiple channels according to the quality of service grades; allocating each of the multiple channels to one of the mobile stations based on a scheduling metric of the mobile station, such that entire data packets of the mobile station are transmitted through the allocated multiple channel; and transmitting entire data packets of the mobile stations through the multiple channels when the allocation of the channel resources has been completed sequentially for each of the multiple channels.

According to the present invention, a method and apparatus for scheduling the data packets transmitted to a plurality of mobile terminals supporting multiple QoS grades in a multichannel wireless communication system includes selecting a channel having the highest channel rate for each of the mobile stations among corresponding channels in sequence for each of the multiple channels; selecting a mobile station using a scheduling metric in the selected channel; and allocating resources of a corresponding channel for a data packet of the selected mobile station, and if resource allocation for the multiple channels is fully completed in sequence, simultaneously transmitting data packets of the plurality of mobile stations using the resources allocated for each individual channel.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
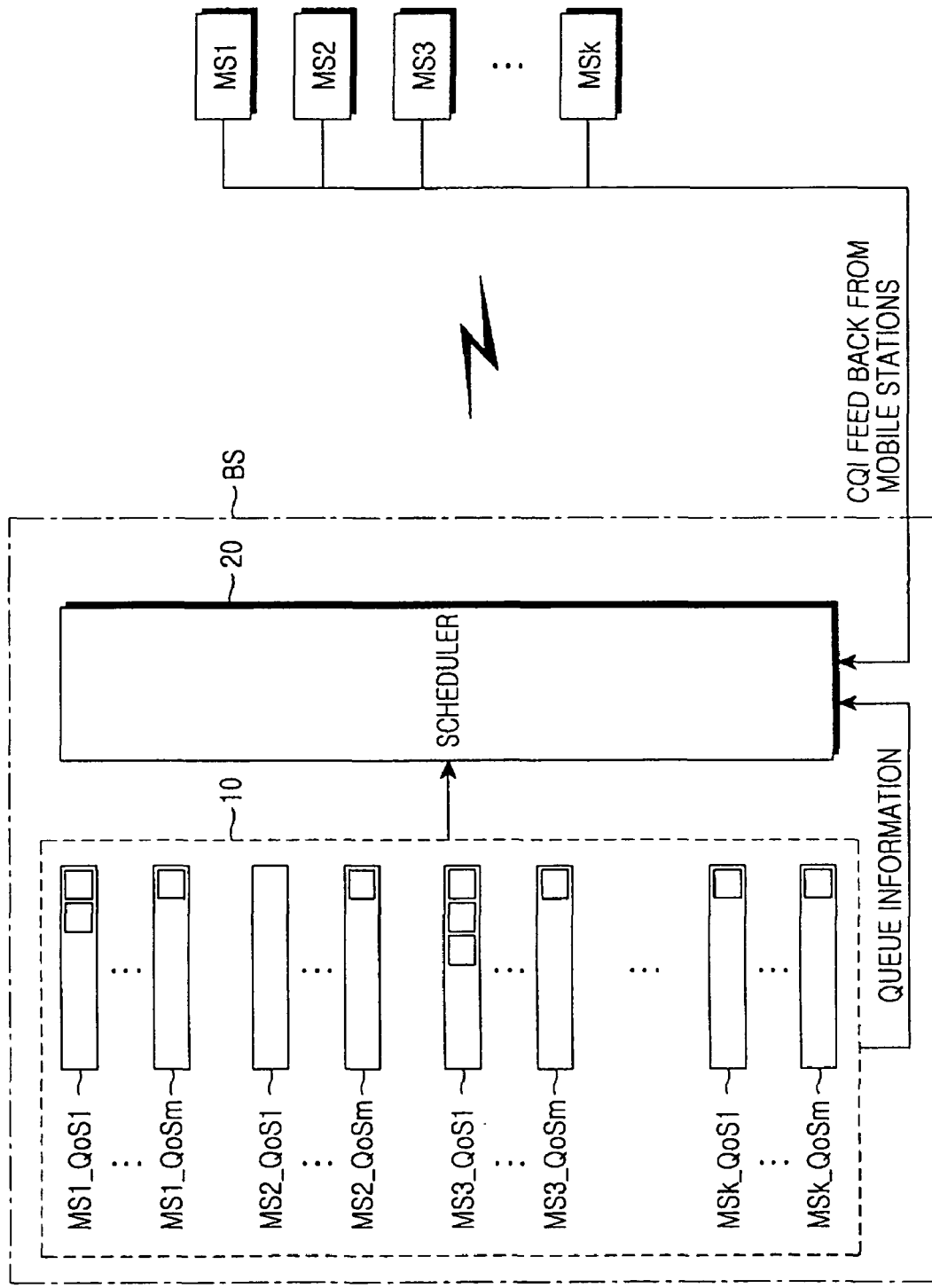
FIG. 1 is a block diagram of an apparatus for scheduling transmission of data packets in a multichannel wireless communication system according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

The present invention proposes a scheduling method and apparatus for transmitting data packets in a communication system employing, for example, Orthogonal Frequency Division Multiplexing (OFDM)/Orthogonal Frequency Division Multiple Access (OFDMA). Although the present invention will be described herein below with reference to the OFDM/OFDMA communication system for convenience, the scheduling method and apparatus proposed in the present invention can also be applied to other communication systems. A preferred embodiment of the present invention will now be described in detail with reference to the accompanying drawings.

Referring to FIG. 1, the inventive apparatus for scheduling transmission of data packets in a multichannel wireless communication includes a queue storage for storing the data packets transmitted to each of a plurality of mobile stations (MSs) MS1 to MSk ("k" represents the number of mobile terminals) according to quality of service(QoS) grades, and a scheduler 20 for scheduling the data packets of the queue storage 10 for transmission through an antenna (not shown).

The queues stored in the queue storage 10 are separated for each MSs MS1 to MSk, and the queues per MS again are separated according to the QoS grades QoS1 to QoSm ("m" represents the number of the grades) representing the orders of priority, according to which the data packets are transmitted.

The scheduler 20 schedules the data packets frame by frame according to a scheduling metric for a single channel. The present invention enables the scheduler 20 to perform the scheduling in two methods. One method is to use different scheduling metrics according to the QoS grades in a single channel or multichannel environment, and the other method is to apply an arbitrary scheduling metric for a single channel containing channel quality information(CQI) to a multichannel environment considering that the scheduler 20 has the CQI of the multiple channels. Hereinafter, more specific descriptions are given for the two methods.

Figure 2:
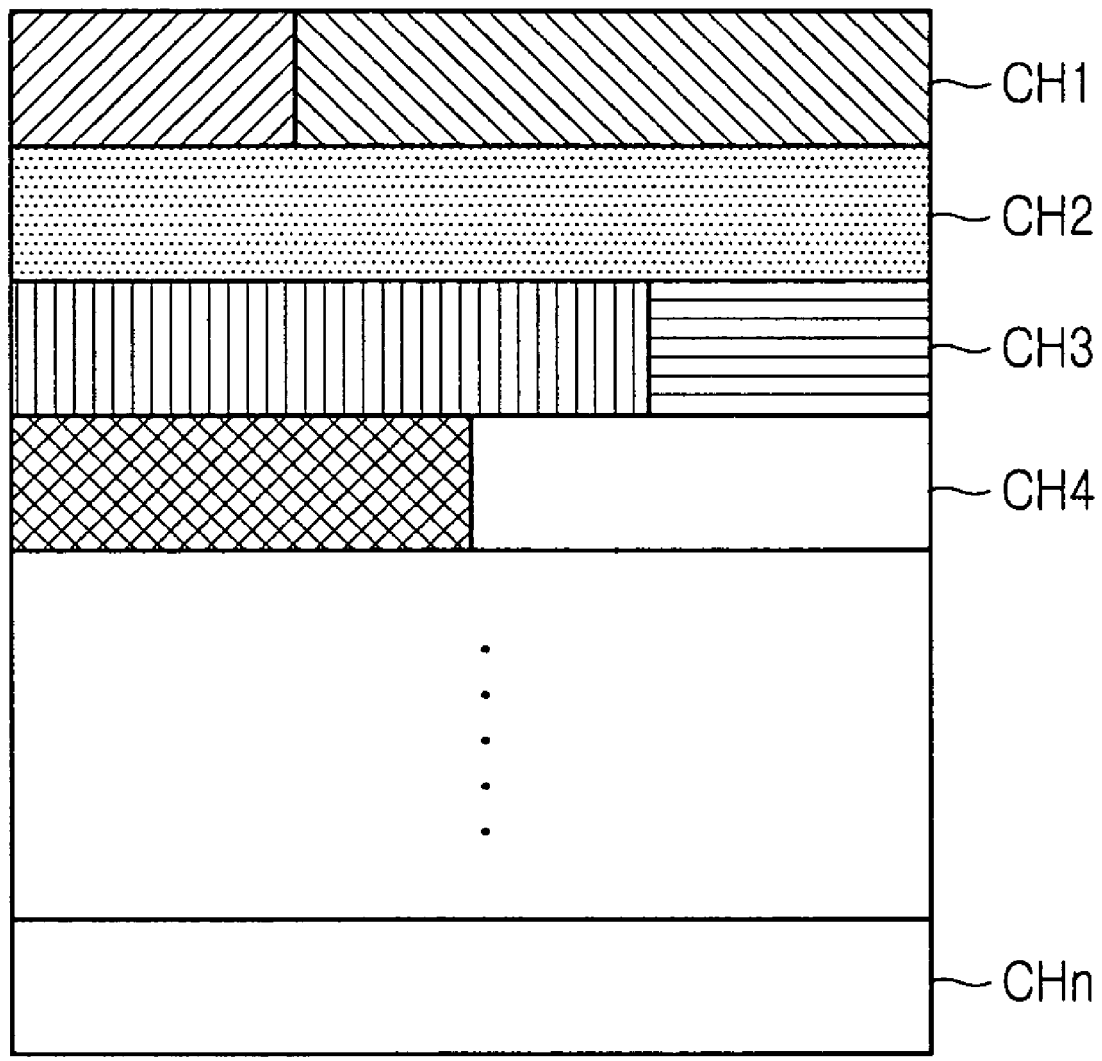
FIG. 2 is a schematic diagram of the structure of a multi-channel frame transmitted by the inventive apparatus.

According to the first method, the scheduler 20 performs the scheduling by using different scheduling metrics according to the QoS grades. The scheduling is performed frame by frame, and sequentially for each of the multiple channels. Namely, as shown in FIG. 2, the data packets transmitted simultaneously through the multiple channels CH1 to CHn ("n" represents the number of the channels) form a single frame. The scheduler 20 first determines the scheduling metric with the QoS grade sufficient to be used for the first channel CH1. To this end, the scheduler 20 checks the scheduling metrics of all the QoS grades in the order of priority to find out the scheduling metric to be properly used for the first channel CH1. For example, assuming the priority order of the QoS grades is QoS1> . . . >QoSm, the channel CH1 is examined from the scheduling metric of QoS1 to that of QoSm so as to find the scheduling metric satisfying the first channel CH1, and the scheduling is performed for the channel CH1 by using the scheduling metric. The channel CH2 is examined from the scheduling metric of QoS1 to that of QoSm so as to find the scheduling metric satisfying the first channel CH1, and the scheduling is performed for the channel CH2 by using the scheduling metric. The scheduling is performed for all channels CH1 to CHn in this scheme, so that all channels may transmit the data packets satisfying QoS.

The scheduler 20 uses the queue information of the queue storage CH10 and CQI feed back from the MSs MS1 to MSk in order to determine the scheduling metric for the channel. The queue information contains the queue length and head of line(HOL) packet delay value pertaining to each of the QoS grades QoS1 to QoSm per each of the mobile terminals. The CQI feed back from the MSs MS1 to MSn includes average throughput, average channel rate and instantaneous channel rate.

When the scheduler 20 performs the scheduling of the channel, the condition for selecting the scheduling metric for the scheduling is, for example, to determine whether the number of the MSs whose HOL packet delay versus the required delay for each QoS grade exceeds a set threshold, or the number of the MSs whose queue length versus the average channel rate for each QoS grade exceeds a set threshold. Such condition being satisfied, the scheduler 20 determines the scheduling metric that is used to schedule the data packets transmitted through the corresponding channel.

Meanwhile, if the scheduling metric selected is not for the highest priority QoS grade but for a lower priority QoS grade, and thus the MS for the channel is determined, the scheduler 20 considers not only the queue of the lower priority QoS grade but also the queues of all the remaining QoS grades. Each MS supporting multiple QoS grades can receive the data packets of multiple QoS grades simultaneously, so the scheduler transmits the data packets of the queue of the QoS grade pertaining to the selected scheduling metric as well as those of all the remaining QoS grades of the MS for the channel in the order of priority. For example, assuming that the scheduling metric for channel CH1 is selected for the lowest priority QoSm grade, and the scheduler uses the scheduling metric pertaining to the QoSm grade to schedule the data packets of the MS MS1 transmitted through the channel CH1, then the scheduler 20 checks the state of the data packets in the queues of all the QoS grades of the MS MS1 as shown in FIG. 1. In this case, there exists for the MS MS1 not only the data packet in the queue of QoSm but also the data packet in the queue of the highest priority QoS1. Hence, the scheduler 20 first transmits the data packet in the queue of QoS1, and then the data packet in the queue of QoSm in the order of priority. Referring to FIG. 2, the frame consisting of multiple channels CH1 to CH4 shows different blocks representing the data packets divided among the queues of the multiple QoS grades for a single MS.

Figure 3:
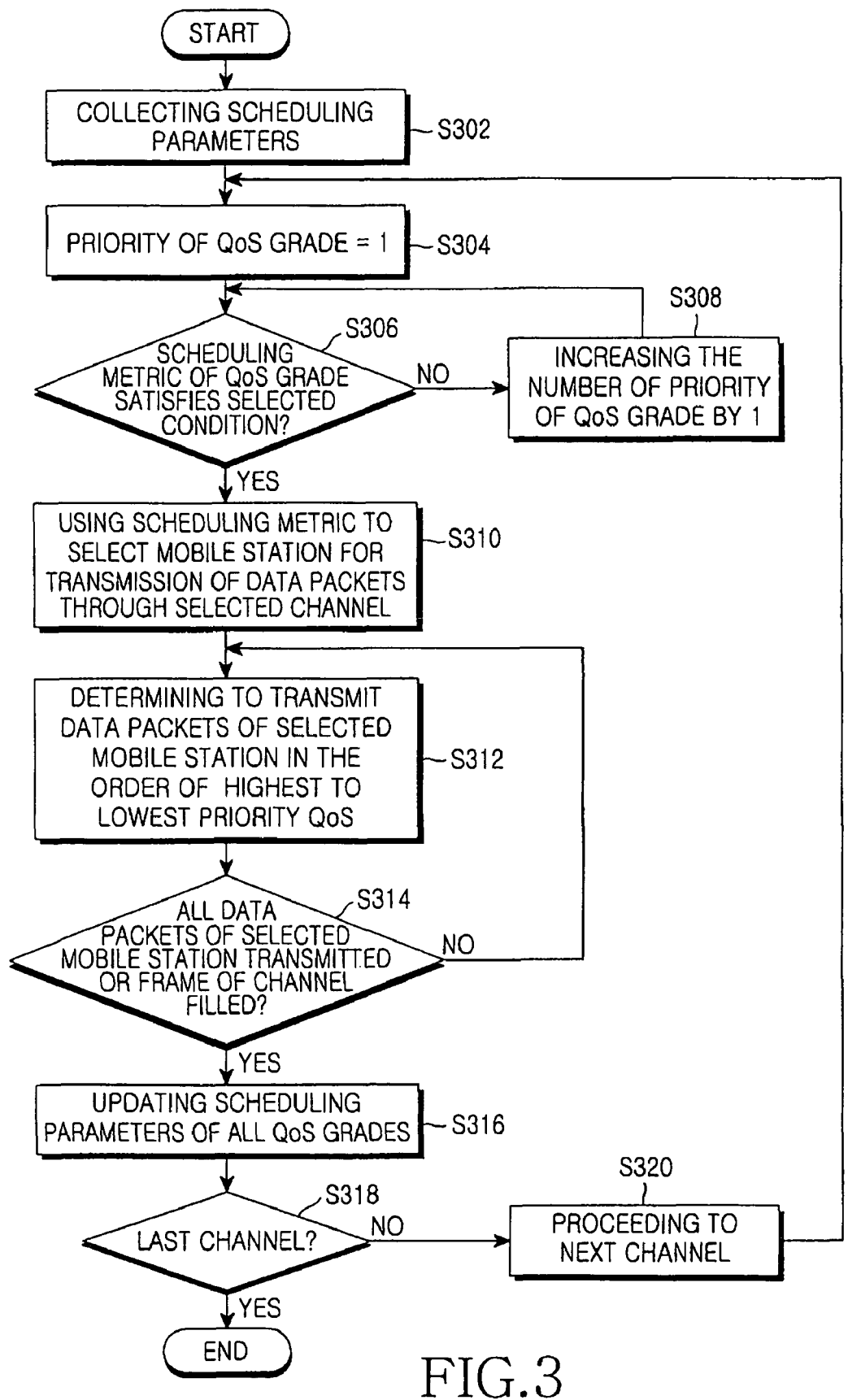
FIG. 3 is a flowchart of the process of scheduling transmission of data packets in a multichannel wireless communication system according to a first embodiment of the present invention.

More particularly in FIG. 3, the scheduler 20 collects in step S302 scheduling parameters for selecting the scheduling metric used to perform the scheduling of the first channel. The scheduling parameters include the queue information of the queue storage 10 and the CQI feed back from the MSs MS1 to MSk.

Next, the scheduler 20 sets the highest priority QoS1 for the scheduling metric in step S304, and determines whether the scheduling metric of QoS1 grade satisfies the condition of selecting the first channel CH1 in step 306. If the scheduling metric of QoS1 grade satisfies the condition, the scheduler 20 uses the scheduling metric of QoS1 grade to select one of the MSs MS1 to MSk for transmission of the data packets through the first channel in step S310.

However, if the scheduling metric of the previous QoS grade satisfies the condition, the scheduler 20 lowers the priority of QoS grade by one stage (assuming that a number increased represents the priority lowered) in step S308 to repeat the step S306, so as to find one of the scheduling metrics of all the QoS grades satisfying the selecting condition by performing the step S310.

Thus, when the MS being selected by the scheduling metric, the scheduler 20 determines in step S312 to transmit the data packets in the queues of the QoS grades of the MS through the corresponding channel in the order of priority. In this case, if the channel has a portion of the resources remaining after satisfying all the data packets determined to be transmitted through the channel up to present, or the queues of the selected MS have the data packets yet to be determined for transmission in step S314, step S312 is repeated until all data packets in the queues of the selected MS are determined for transmission, or until there is no remaining portion of the resources in the channel. Thereafter, the parameters of the scheduling metric are updated in step S316. Subsequently, the scheduler determines in step S318 whether the present scheduling is for the last channel, and if not, it proceeds to the next channel in step S320 to repeat the process from step S304.

As described above in the first scheduling method, the single scheduler 20 performs the scheduling by using a scheduling metric fitting each of the QoS grades for each channel. Transmission of the data packets is performed after the resources of all channels have been allocated, as shown in FIG. 3. After allocation of the resources of one channel to the data packets of a MS is completed, steps S314 and S316 are performed to allocate the resources of the next channel by updating the parameters such as queue length and HOL packet delay. This first method may apply to various wireless communication systems such as OFDMA, frequency division multiple access (FDMA), time division multiple access (TDMA) and code division multiple access (CDMA).

Alternatively, the second scheduling method enables the scheduler 20 to use a scheduling metric for a single channel with a new parameter properly obtained for each of the multiple channels by considering the channel rate of each channel. For example, among the channels whose resources have not yet been allocated to the present frame for each MS, the highest CQI value is selected as the channel parameter of the corresponding channel applied to calculate the single channel scheduling metric.

In this method, the scheduling metric can be used in two ways. Namely, the scheduling metric changes according to whether the buffer is limited or unlimited. The buffer indicates the queue storage 10, as shown in FIG. 1. The following Equation 1 represents the scheduling metric used when the scheduler 20 employs a limitless buffer.

$$k*(n) = \mathrm{argmax}_k g_k(\mathrm{CH\_Rate}_k(n)) \quad (1)$$

Equation 1 represents the scheduling metric for determining a MS MSk assigned to channel CHn, wherein $g_k(x)$ is a simple gain function defined according to the type of scheduling metric taken by the scheduler 20. Equation 2 is an example of $g_k(x)$ for maximal rate scheduling. $Ch_{13}Rate_k(n)$ represents the channel rate for each channel.

$$g_k(X)=x \quad (2)$$

Meanwhile, Equation 3 represents the scheduling metric when the scheduler 20 uses a limited buffer.

$$k*(n) = \mathrm{argmax}_k a_k \mathrm{Ch\_Rate}_k(n) g_k(\mathrm{HOL\_Delay}_k) \quad (3)$$

Equation 3 also represents the scheduling metric for determining a mobile terminal MSk assigned to channel CHn, wherein $a_k$ represents a constant, $Ch_{13}Rate_k(n)$ represents the channel rate for each mobile terminal, and $HOL_{13}Delay_k$ represents the HOL packet delay for each channel. $g_k(x)$ is a simple gain function defined according to the type of scheduling metric taken by the scheduler 20, as in the following Equations 4 and 5.

$$g_k(x)=x \quad (4)$$

$$g_k(X)=\exp(x) \quad (5)$$

In Equation 4, $g_k(x)$ is for the M-LWDF scheduler, and in Equation 5, $g_k(x)$ is for the scheduler using exponential rule.

According to the second scheduling method, the scheduler 20 is provided with the channel rates of the multiple channels in the same frame, so that it may select a proper channel for each of the MSs MS1 to MSk. In other words, the scheduler 20 selects the channel having the highest channel rate among the channels not yet allocated in a corresponding frame for each of MSs MS1 to MSk.

This scheduling method need not considerably increase complexity by searching all MSs at every allocation of the resources, because the channel having the highest channel rate may be different for each of the MSs MS1 to MSk. In addition, the scheduling metrics are compared by using the channel with the highest channel rate for each of the MSs MS1 to MSk, so that the most desirable channel in the present state is always selected. Moreover, the selection of a channel can vary according to the design of the scheduler 20 without exclusively using the highest channel rate. For example, the MSs with the average signal to noise ratio(SNR) less than a threshold are assigned with the channel having the highest channel rate, while the other mobile terminals are assigned with the channel of the mean channel rate.

Figure 4:
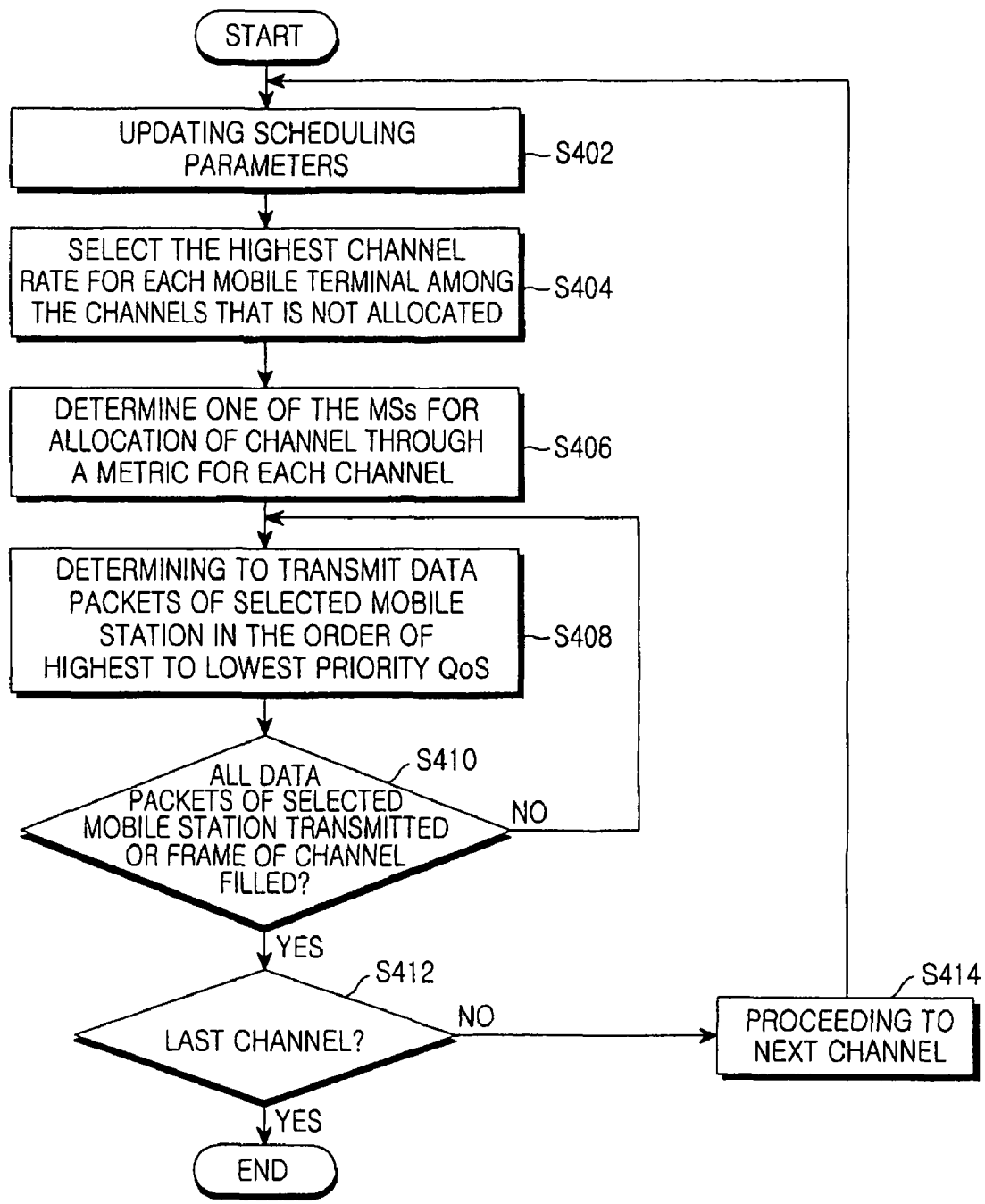
FIG. 4 is a flowchart of the process of scheduling transmission of data packets in a multichannel wireless communication system according to a second embodiment of the present invention.

More specifically in FIG. 4, the scheduler 20 updates the parameters of the scheduling metric to allocate the channels not yet allocated in the corresponding frame in step S402.

The scheduler 20 selects in step S404 the MS having the highest channel rate among the channels not yet allocated in the corresponding frame for each of the MSs. That is, if a particular one of the MSs is selected, the scheduler 20 selects the channel having the highest channel rate of the selected MS among the channels not yet allocated in the corresponding frame. In this way, the scheduler 20 recognizes the channel rate of each MS, thereby recognizing the channel allocated to each of the MSs.

Thereafter, in step S406, the scheduler 20 determines the MS to which it will allocate the channel not allocated in the corresponding frame among the MSs, using the scheduling metric, for example, the single channel metric. In this case, the scheduler 20 determines the MS to which it will allocate channels, using the channel rates of the individual MSs, described in connection with Equation 1 and Equation 3, and the scheduling parameters updated in step S402, for example, the single channel metrics associated with the packet delay value.

Subsequently, if the channel has a portion of the resources remaining after satisfying all the data packets determined to be transmitted through the channel up to present, or the queues of the selected MS have the data packets yet to be determined for transmission in step S410, step S408 is repeated until all data packets in the queues of the selected MS are determined for transmission, or until there is no remaining portion of the resources in the channel. The scheduler determines in step S412 whether the present scheduling is for the last channel, and if not, it proceeds to the next channel in step S414 to repeat the process from the step S402. This second scheduling method may apply to the wireless communication systems of OFDMA and FDMA.

Thus, the present invention employs the scheduler for a single channel with considerably reduced complexity in a multichannel wireless communication system, and improves the system throughput by scheduling according to the QoS grades. While the invention has been shown and described with reference to a certain preferred embodiment thereof, it will be understood by those skilled in the art that various changes in form and details may be made therein without departing from the spirit and scope of the invention.

What is claimed is:

1. An apparatus for scheduling data packet transmission to mobile stations supporting multiple quality of service (QoS) grades in a wireless communication system including multiple channels, comprising:

a queue storage for storing data packets of the mobile stations, wherein the queue storage includes a separate queue entry for each of the mobile stations, and each separate queue entry for each of the mobile stations is separated according to the multiple QoS grades representing orders of priority, according to which stored data packets are transmitted; and a scheduler for calculating, for each of the mobile stations, a single channel scheduling metric using a channel quality information (CQI) value of a channel having a highest CQI value among channels whose resources have not been allocated to a present frame, selecting, for each of the mobile stations, a most desirable channel in a present state by comparing the single channel scheduling metric with a parameter of a channel having a highest channel rate for each of the mobile stations, selecting a mobile station transmitting a CQI value of the channel having the highest CQI value;

determining QoS grades for queued data packets of the selected mobile station, and sequentially transmitting the queued data packets of the selected mobile station according to the determined QoS grades, wherein the scheduling metrics are mapped differently for each QoS grade, wherein when the queue storage comprises a limited buffer, the single channel scheduling metric is calculated using a certain constant, a channel rate for each of the mobile stations, and a Head Of Line (HOL) packet delay for each of the multiple channels, and a simple gain function, and wherein the single channel scheduling metric is calculated by:

$$k^*(n) = \arg\max_k \; a_k \mathrm{Ch\_Rate}_k(n) g_k(\mathrm{HOL\_Delay}_k),$$

where $k^*(n)$ is a scheduling metric for determining a mobile station assigned to a channel (Ch)n, $a_k$ represents the certain constant, $\mathrm{Ch\_Rate}_k(n)$ represents the channel rate for each of the mobile stations, $\mathrm{HOL\_Delay}_k$ represents the HOL packet delay for each of the multiple channels and $g_k(x)$ is the simple gain function.

2. A method for scheduling data packet transmission to mobile stations supporting multiple quality of service (QoS) grades in a wireless communication system including multiple channels, comprising:

storing, in a queue storage, data packets of the mobile stations, the queue storage including a separate queue entry for each of the mobile stations, wherein each separate queue entry for each of the mobile stations is separated according to the multiple QoS grades representing orders of priority, according to which stored data packets are transmitted;

calculating, for each of the mobile stations, a single channel scheduling metric using a channel quality information (CQI) value of a channel having a highest CQI value among channels whose resources have not been allocated to a present frame;

selecting, for each of the mobile stations, a most desirable channel in a present state by comparing the single channel scheduling metric with a parameter of a channel having a highest channel rate for each of the mobile stations;

selecting a mobile station transmitting the CQI value of the channel having the highest CQI value;

determining QoS grades for queued data packets of the mobile station; and sequentially transmitting the queued data packets of the mobile station according to the determined QoS grades, wherein the scheduling metrics are mapped differently for each QoS grade, wherein when the queue storage includes a limited buffer, the single channel scheduling metric is calculated using a certain constant, a channel rate for each of the mobile stations, and a Head Of Line (HOL) packet delay for each of the multiple channels, and a simple gain function, and wherein the single channel scheduling metric is calculated by:

$$k^*(n) = \arg\max_k \; a_k \mathrm{Ch\_Rate}_k(n) g_k(\mathrm{HOL\_Delay}_k),$$

where $k^*(n)$ represents a scheduling metric for determining a mobile station assigned to a channel (Ch)n, $a_k$ represents the certain constant, $\mathrm{Ch\_Rate}_k(n)$ represents the channel rate for each of the mobile stations, $\mathrm{HOL\_Delay}_k$ represents the HOL packet delay for each of the multiple channels and $g_k(x)$ represents the simple gain function.

* * * * *